K. EXTER.
Improvement in Railway-Car Brakes.
No. 130,029.   Patented July 30, 1872.
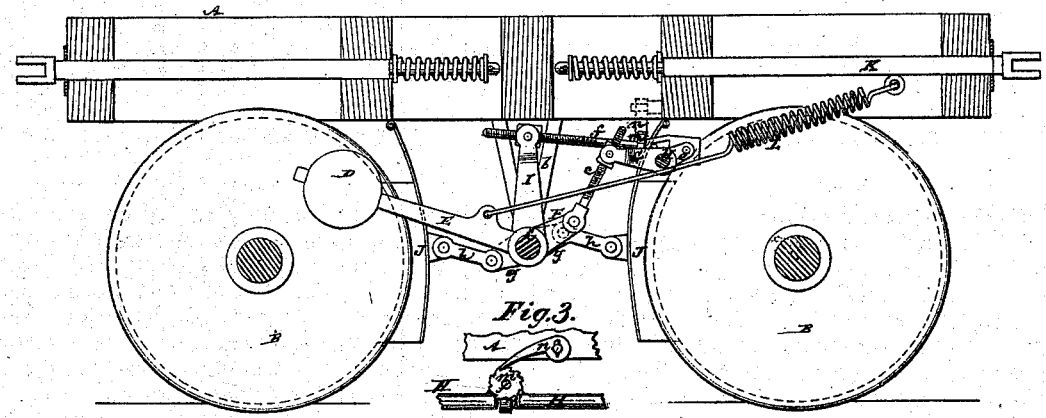
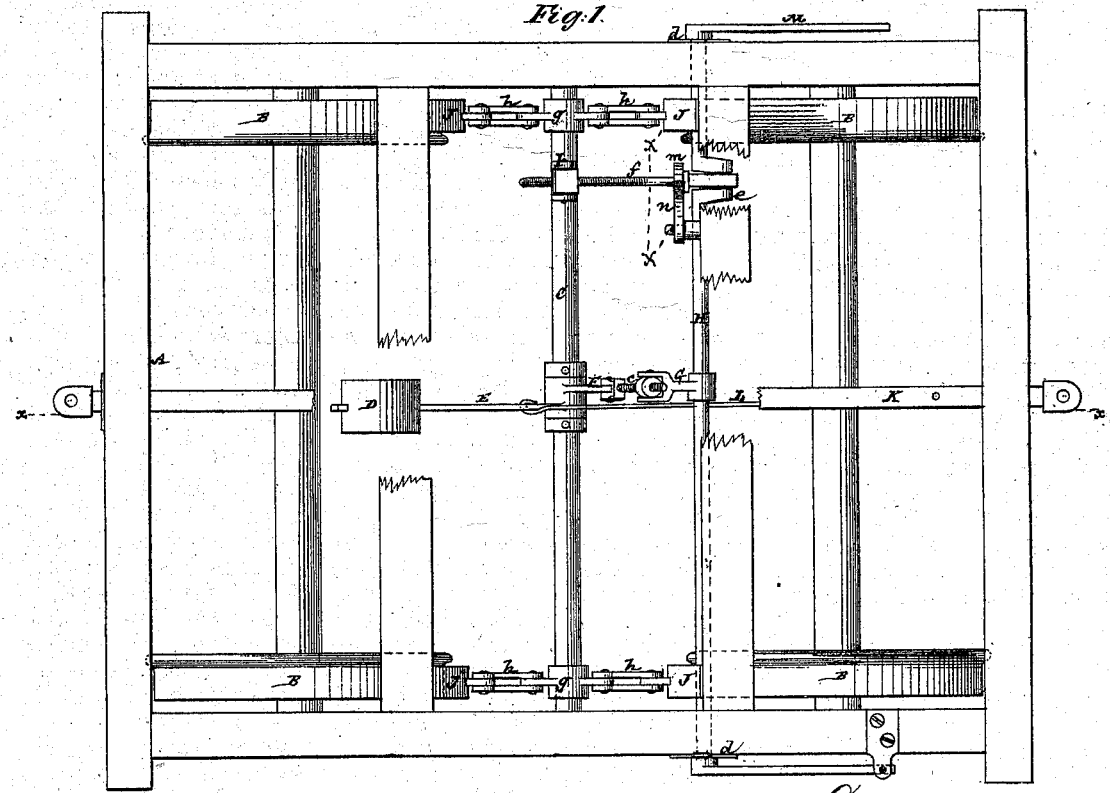

UNITED STATES PATENT OFFICE.

KARL EXTER, OF MUNICH, BAVARIA, ADMINISTRATOR OF KARL EXTER, SENIOR, DECEASED.

IMPROVEMENT IN RAILWAY CAR-BRAKES.

Specification forming part of Letters Patent No. 130,029, dated July 30, 1872.

*To all whom it may concern:*

Be it known that the following is a full, clear, and exact description of an Improved Brake for Railroad Cars or Wagons and other Vehicles, the same being the invention of KARL EXTER, deceased, late of Munich, in the Kingdom of Bavaria, reference being had to the accompanying drawing forming part of this specification, and in which—

Figure 1 represents a plan of a railroad truck or wagon in part, with the improved brake applied thereto; and Fig. 2, a vertical longitudinal section of the same at the line $x$ $x$ in Fig. 1. Fig. 3 is a face view of the ratchet and pawl taken on the line $x'$ $x'$ in Fig. 1.

Similar letters of reference indicate corresponding parts.

This invention consists in a novel combination of brake mechanism, whereby the brake-blocks or friction-shoes of the brake are forced against the wheels of the vehicle by a weight or spring, through the instrumentality of levers, subject to the control of the draw-bar or traction device, that has a counteracting or releasing effect upon the brake, which is a self-acting one, yet controllable by hand, the friction shoes or blocks being only automatically forced against the wheels whenever the operating weight or spring is free from the counteracting effect of the traction. The invention also includes means whereby the friction blocks or shoes are made automatically adjustable, to meet the exigencies of wear and tear.

In the accompanying drawing, A represents the truck portion of a railroad wagon or vehicle, and B B its wheels. C is a main brake-axle, arranged to extend across the truck between either pair of wheels, and free to turn in hangers $b$ at its ends. D is a weight on the end of a lever, E; or a spring arranged to have a like action may be substituted for the weight, if desired. Said lever E is fitted to turn loosely on the axle C, and has connected with it, on the opposite side of said axle, a shorter arm or lever, F, which is connected by a rod, $c$, with an arm, G, fast on a secondary cross-shaft, H. In this way the force of the weight D, when down, which is when the wagon is at rest or the brake is being applied, is conveyed to the counter-shaft H, that is free to turn in bearings $d$ $d$, and is constructed or provided with a small crank, $e$, that is connected by a rod, $f$, with a lever, I, fast to the axle C. Upon the ends of this axle C are short cross-beams or arms $g$ $g$, which are joined by links $h$ $h$ to the friction-shoes or blocks J J on both or opposite sides of the vehicle. Accordingly as the lever I is rocked to the right or to the left are the blocks J J thrown toward or from the wheels. By this combination and arrangement of parts the weight B operates to throw the blocks J J against the wheels when not counteracted by the traction as applied to the draw-bar K, which is connected by a rod or combined rod and spring, L, to the lever E, to lift, when said rod is drawn outward, the weight D, and thereby to release the blocks from the wheels. Thus the action of the weight D on the brake is made to cease every time the coupling-hooks or devices that connect the one vehicle with the preceding one are drawn out, and commences to operate as soon as the screw or other couplings become slack. By shifting the weight D on the lever E, or substituting a heavier or lighter one for it, the power of the brake may be varied as required. This explains the self-acting operation of the brake.

To operate said brake by hand, both as regards throwing the blocks J J on or off the wheels, or to increase or diminish the force of the weight D, the shaft H may be independently worked by a lever, M, through a rod or handle, the connection L of the lever E with the draw-bar K admitting of this. When it is required to put the brake out of action—as, for instance, when the locomotive is pushing instead of drawing—the shaft H may also be adjusted or its arm G be set and secured or held so that the brake ceases to be self-acting.

The connecting-rod $f$ is fitted so as to be capable of turning, and is provided with a screw-thread that fits a nut in the lever I, so as to lengthen or shorten the connection between the crank $e$ and the lever I, for the purpose of adjusting the blocks J J to the wheels, but principally by turning said rod so as to shorten the connection to provide for the wear and tear of the brake-blocks. This adjustment may be made automatic, as follows: Upon the rod $f$ is a ratchet-wheel, $m$, that, whenever the crank *e* moves further than is due to a proper set of the blocks from the wheels, or, in other words, whenever the distance between the brake-blocks and wheels has been unduly increased by the wear of the blocks, is caught by a pawl, *n*, and the shaft *f* rotated so as to shorten the connection between the crank *e* and lever I, and thus set the blocks up closer to the wheels.

What is here claimed, and desired to be secured by Letters Patent, is—

1. The combination of the main brake-axle C and loose lever E, controlled by a weight or spring, as described, with the counter-shaft H, operated by said lever, and serving in its turn to vibrate the brake-axle C, subject to the control of the draw-bar K or traction device, and capable, also, of being operated by hand, substantially as specified.

2. The combination of the main brake-axle C and its friction shoes or blocks J J, the loose lever E, controlled by a weight or spring, the lever F, the rod *c*, the arm G, the counter-shaft H, the crank *e*, and the connecting-rod *f*, the lever I, the connection L, and the draw-bar K, essentially as shown and described.

3. The combination of the rotating connecting-rod *f*, having a screw-thread on it, the ratchet-wheel *m*, and pawl *n*, the crank *e*, the lever I, the main brake-axle C, with its attached shoes J J, and the counter-shaft H, substantially as described, and for the purpose herein set forth.

KARL EXTER.

Witnesses:
G. HENRY HORSTMANN,
G. ZWISLER.